US012341829B2

(12) United States Patent
Springer

(10) Patent No.: US 12,341,829 B2
(45) Date of Patent: Jun. 24, 2025

(54) USING A PERIPHERAL DEVICE TO TRANSITION BETWEEN USER DEVICES WITHIN A VIDEO CONFERENCE

(71) Applicant: Zoom Communications, Inc., San Jose, CA (US)

(72) Inventor: Shane Paul Springer, Oregon City, OR (US)

(73) Assignee: Zoom Communications, Inc., San Jose, CA (US)

( * ) Notice: Subject to any disclaimer, the term of this patent is extended or adjusted under 35 U.S.C. 154(b) by 14 days.

(21) Appl. No.: 18/193,319

(22) Filed: Mar. 30, 2023

(65) Prior Publication Data

US 2024/0333779 A1    Oct. 3, 2024

(51) Int. Cl.
*H04L 65/1094* (2022.01)
*H04L 12/18* (2006.01)
*H04L 65/1093* (2022.01)
*H04N 7/14* (2006.01)

(52) U.S. Cl.
CPC ...... *H04L 65/1094* (2022.05); *H04L 12/1831* (2013.01); *H04L 65/1093* (2013.01); *H04N 7/147* (2013.01)

(58) Field of Classification Search
CPC ............. H04L 65/1094; H04L 12/1831; H04L 65/1093; H04N 7/147
USPC ....................................................... 709/227
See application file for complete search history.

(56) References Cited

U.S. PATENT DOCUMENTS

| | | | |
|---|---|---|---|
| 7,170,545 B2* | 1/2007 | Rodman | H04L 65/403 348/E7.083 |
| 7,508,723 B2* | 3/2009 | Goodwin | G11C 7/1051 365/198 |
| 8,005,987 B2 | 8/2011 | Richardson et al. | |
| 8,069,379 B2* | 11/2011 | Perego | G11C 7/1075 710/14 |
| 8,223,720 B1 | 7/2012 | Efrati et al. | |
| 8,228,861 B1* | 7/2012 | Nix | H04L 65/1069 370/329 |
| 8,751,667 B2* | 6/2014 | Santamaria | H04L 65/1089 709/227 |
| 8,760,492 B2* | 6/2014 | Halavy | H04N 7/152 348/14.09 |
| 8,799,486 B2* | 8/2014 | Eom | H04L 51/04 709/228 |
| 8,890,927 B2* | 11/2014 | Stocker | H04M 7/0024 382/113 |

(Continued)

*Primary Examiner* — Melvin H Pollack
(74) *Attorney, Agent, or Firm* — Young Basile Hanlon & MacFarlane, P.C.

(57) ABSTRACT

A system may transmit, from a first user device connected to a video conference and associated with a conference participant, an indication to a peripheral device to temporarily buffer a portion of media content of the video conference. The system may perform, within the video conference, a transition of the conference participant from the first user device to a second user device connected to the video conference including causing the peripheral device to relay the portion of the media content during the transition. In some implementations, the portion of the media content may be buffered by storing less than a predefined amount of time of the media content received by the first user device in a random access memory of the peripheral device.

20 Claims, 9 Drawing Sheets

(56) References Cited

U.S. PATENT DOCUMENTS

| | | | |
|---|---|---|---|
| 8,908,520 B2* | 12/2014 | Yeap | H04M 11/062 |
| | | | 370/235 |
| 9,146,867 B2* | 9/2015 | Mogul | G06F 12/1027 |
| 9,232,187 B2* | 1/2016 | Zhou | H04L 12/1827 |
| 9,363,722 B2 | 6/2016 | Ahluwalia | |
| 9,462,230 B1* | 10/2016 | Agrawal | G06Q 50/20 |
| 9,489,323 B2* | 11/2016 | Amirkhany | G06F 13/4022 |
| 9,516,269 B2* | 12/2016 | Zhou | H04L 65/1069 |
| 9,591,263 B2* | 3/2017 | Willig | H04L 65/1016 |
| 9,661,142 B2* | 5/2017 | Gunasekar | H04Q 3/0045 |
| 9,681,232 B2 | 6/2017 | Millington et al. | |
| 10,057,662 B2* | 8/2018 | Talukder | H04L 65/1089 |
| 10,085,029 B2* | 9/2018 | Mittal | H04N 7/141 |
| 10,091,461 B2* | 10/2018 | Eisenberg | H04L 65/765 |
| 10,142,423 B2* | 11/2018 | Verger | H04L 65/1083 |
| 10,334,110 B2* | 6/2019 | Herrin | G06Q 10/1095 |
| 10,423,760 B2* | 9/2019 | Moharir | H04N 7/185 |
| 10,620,797 B2* | 4/2020 | Garmark | H04L 65/612 |
| 10,623,844 B2 | 4/2020 | Clayton et al. | |
| 10,630,555 B1* | 4/2020 | Delaney | H04L 12/4641 |
| 10,652,139 B1* | 5/2020 | Johnson | H04L 45/22 |
| 10,659,501 B2* | 5/2020 | Klemm | H04L 65/1069 |
| 10,694,221 B2* | 6/2020 | Liu | G06F 17/142 |
| 10,819,951 B2* | 10/2020 | Zhou | H04L 12/1831 |
| 10,893,087 B1* | 1/2021 | Munoz | H04L 51/58 |
| 10,911,992 B2* | 2/2021 | Abuan | H04W 36/0022 |
| 10,965,480 B2* | 3/2021 | Beel | H04L 12/1831 |
| 11,011,183 B2* | 5/2021 | Shao | G10L 15/16 |
| 11,019,151 B2* | 5/2021 | Nolan | H04W 4/70 |
| 11,088,947 B2* | 8/2021 | Altman | H04L 41/145 |
| 11,115,327 B2* | 9/2021 | Spraggins | H04L 41/12 |
| 11,122,328 B2 | 9/2021 | Graham et al. | |
| 11,128,636 B1* | 9/2021 | Jorasch | G06F 3/0346 |
| 11,167,212 B1* | 11/2021 | Buliani | H04L 69/40 |
| 11,172,006 B1* | 11/2021 | Ashkenazi | G06F 3/1454 |
| 11,206,443 B2* | 12/2021 | Barvo | H04N 21/242 |
| 11,249,715 B2* | 2/2022 | Ashkenazi | H04L 65/403 |
| 11,258,982 B2* | 2/2022 | Atkins | H04N 7/15 |
| 11,294,544 B2 | 4/2022 | Garmark et al. | |
| 11,330,033 B2* | 5/2022 | Munoz | H04L 51/224 |
| 11,336,926 B2* | 5/2022 | Perlman | H04L 65/75 |
| 11,349,889 B1* | 5/2022 | Ashkenazi | H04L 12/1813 |
| 11,363,082 B2* | 6/2022 | Garrett | H04N 7/147 |
| 11,411,840 B2* | 8/2022 | Cioffi | G06Q 10/103 |
| 11,503,426 B2* | 11/2022 | Barzuza | H04M 1/6066 |
| 11,516,434 B1* | 11/2022 | Agrawal | H04M 3/567 |
| 11,550,404 B2* | 1/2023 | Hinckley | H04L 65/401 |
| 11,557,121 B2* | 1/2023 | Cohen-Tidhar | G06V 20/41 |
| 11,659,023 B2* | 5/2023 | Shelton, IV | A61B 34/25 |
| | | | 709/227 |
| 11,665,284 B2* | 5/2023 | Jorasch | H04L 12/1822 |
| | | | 709/204 |
| 11,722,536 B2* | 8/2023 | Crumley | G06F 3/04842 |
| | | | 709/231 |
| 11,722,544 B2* | 8/2023 | Agrawal | H04L 65/4015 |
| | | | 709/231 |
| 11,765,215 B2* | 9/2023 | Agrawal | H04L 65/60 |
| | | | 348/14.08 |
| 11,785,119 B2* | 10/2023 | Rezek | H04L 67/63 |
| | | | 709/227 |
| 11,846,981 B2* | 12/2023 | Dolev | G06F 9/451 |
| 11,847,377 B2* | 12/2023 | Abhishek | H04R 5/04 |
| 11,863,700 B2* | 1/2024 | Dellinger | H04W 4/029 |
| 12,022,225 B2* | 6/2024 | Balde | H04N 23/632 |
| 12,069,365 B2* | 8/2024 | Popovic | H04N 21/4305 |
| 12,075,061 B2* | 8/2024 | Maharana | G06T 7/20 |
| 12,095,579 B2* | 9/2024 | VanBlon | H04N 7/152 |
| 12,095,582 B2* | 9/2024 | Baker | H04L 65/80 |
| 12,143,751 B2* | 11/2024 | Benson | H04L 65/403 |
| 12,149,578 B2* | 11/2024 | Aristarkhov | H04N 19/14 |
| 2007/0213038 A1* | 9/2007 | Masseroni | H04L 47/263 |
| | | | 455/414.3 |
| 2007/0263980 A1 | 11/2007 | Chen et al. | |
| 2010/0238262 A1* | 9/2010 | Kurtz | H04N 7/142 |
| | | | 348/14.01 |
| 2013/0109371 A1* | 5/2013 | Brogan | G06F 8/60 |
| | | | 361/679.09 |
| 2018/0008417 A1 | 1/2018 | Lang | |
| 2020/0230505 A1* | 7/2020 | van der Laan | A63F 13/352 |
| 2021/0007023 A1 | 1/2021 | Umapathy et al. | |
| 2021/0250195 A1* | 8/2021 | Baker | H04L 12/1827 |
| 2021/0319408 A1* | 10/2021 | Jorasch | H04L 12/1827 |
| 2022/0004315 A1 | 1/2022 | Zhang et al. | |
| 2022/0317777 A1* | 10/2022 | Lee | H04N 21/47 |
| 2023/0045237 A1* | 2/2023 | Wexler | G06V 40/20 |
| 2023/0139989 A1* | 5/2023 | Kraus | G06F 3/013 |
| | | | 345/427 |
| 2023/0283495 A1* | 9/2023 | Liu | G06V 30/10 |
| | | | 709/204 |
| 2023/0309163 A1* | 9/2023 | Mitty | H04L 65/1069 |
| 2023/0371091 A1* | 11/2023 | Etzine | H04W 48/10 |
| 2024/0292092 A1* | 8/2024 | Ragavan | H04R 3/00 |

* cited by examiner

USING A PERIPHERAL DEVICE TO TRANSITION BETWEEN USER DEVICES WITHIN A VIDEO CONFERENCE

FIELD

This disclosure relates generally to video conferencing and, more specifically, to using a peripheral device to transition between user devices within a video conference.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION OF THE DRAWINGS

Figure 1:
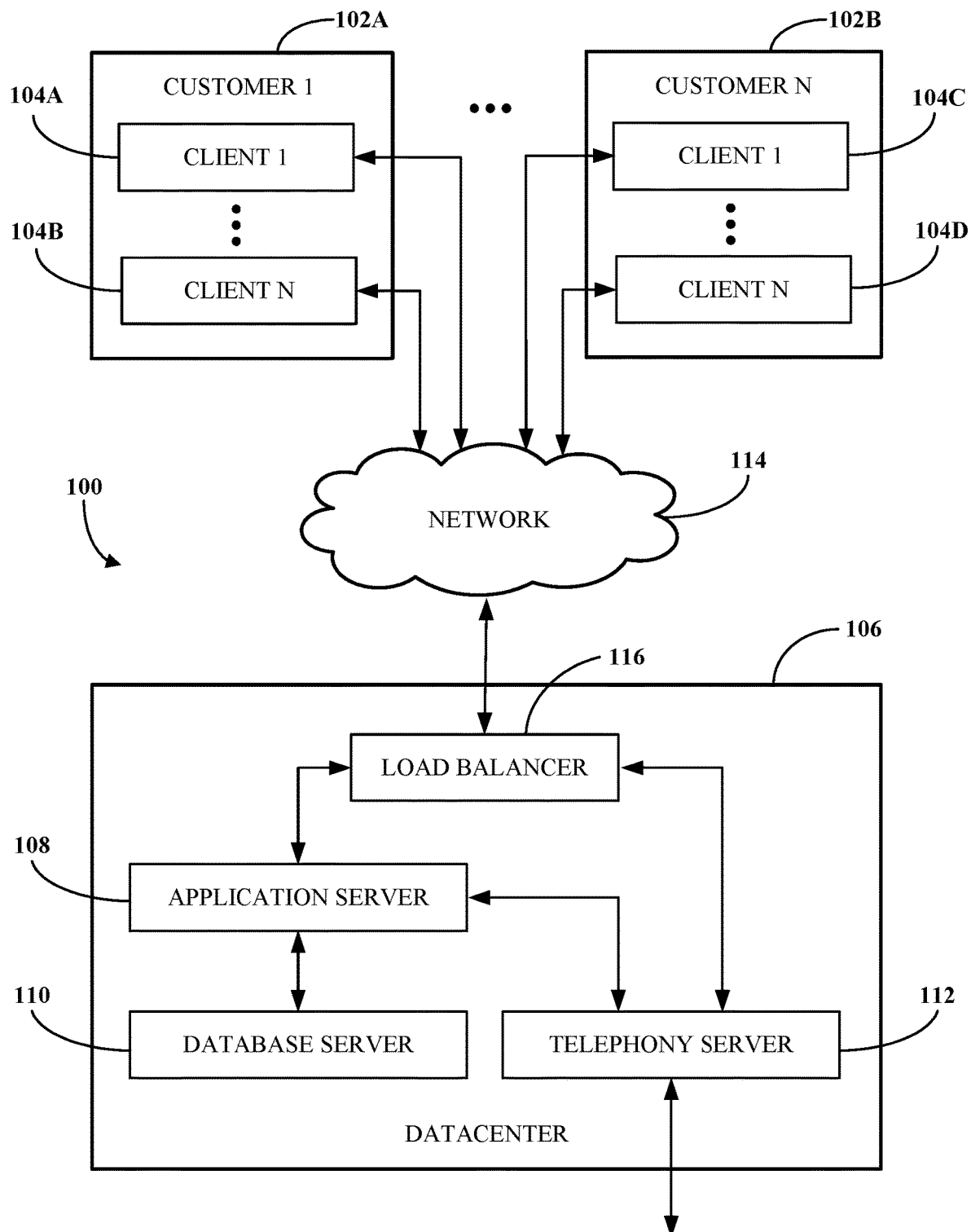
FIG. 1 is a block diagram of an example of an electronic computing and communications system.

Enterprise entities rely upon several modes of communication to support their operations, including telephone, email, internal messaging, and the like. These separate modes of communication have historically been implemented by service providers whose services are not integrated with one another. The disconnect between these services, in at least some cases, requires information to be manually passed by users from one service to the next. Furthermore, some services, such as telephony services, are traditionally delivered via on-premises systems, meaning that remote workers and those who are generally increasingly mobile may be unable to rely upon them. One type of system which addresses problems such as these includes a unified communications as a service (UCaaS) platform, which includes several communications services integrated over a network, such as the Internet, to deliver a complete communication experience regardless of physical location.

Individuals may use software such as of a UCaaS platform to communicate and collaborate remotely with one another in video conferences. During a video conference, a conference participant may use a device (e.g., a desktop, laptop, tablet, or other computer, including a display, camera, microphone, and speakers) to send video data depicting themselves and audio data representing their speech to other conference participants and to receive video and audio data from the other conference participants. In some cases, during a video conference, a conference participant may wish to transition from one device to another to continue participating in the video conference. For example, the conference participant could be using a smartphone while traveling to a location (e.g., while walking or a passenger in a vehicle), then may wish to transition to a desktop, laptop, or tablet at the location. In another example, the conference participant could be using a device associated with a particular space, such as a computer in an office or living room, then may wish to transition to another device associated with another space, such as another computer in a conference room or kitchen. During the transition from one device to another, the conference participant may temporarily disconnect from the video conference. As a result, the conference participant may lose information associated with the video conference due to the disconnection. For example, the disconnection may cause the conference participant to miss media content and lose chat messages shared during the video conference.

Implementations of this disclosure address problems such as these by designating a peripheral device to buffer a portion of media content of a video conference and by causing the peripheral device to adaptively relay the portion of the media content to a conference participant while transitioning between devices connected to the video conference. A first user device (e.g., a desktop, laptop, tablet, smartphone or other computer) associated with a conference participant may connect to a video conference and may transmit and receive media content during the video conference (e.g., sending and receiving video and/or audio data). The first user device may also connect to a peripheral device for relaying the media content to the conference participant. For example, the peripheral device could be a device configured to present video and/or audio data to the conference participant, such as a wearable device (e.g., headphones, headset, smartwatch, or glasses) or another device (e.g., display or speakers).

The first user device may transmit, to the peripheral device, an indication of an upcoming transition or switch at some point during the video conference. The indication may cause the peripheral device to temporarily buffer a portion of the media content (e.g., storing less than a predefined amount time of the media content in a micro-buffer, such as less than five seconds of the media content in a random access memory (RAM) of the peripheral device). In some implementations, the portion of the media content may include content other than video and/or audio media shared by participants to the video conference, such as chat messages or metadata associated with the video conference.

The system may then perform, within the video conference, a transition of the conference participant from the first user device connected to the video conference to a second user device connected to the video conference (e.g., another desktop, laptop, tablet, smartphone, or other computer), such as by communicating a handoff event between the first user device and the second user device. Performing the transition may include disconnecting the first user device from the video conference, connecting the second user device to the video conference), and terminating the communication between the first user device and the second user device. During the transition, the peripheral device may relay the portion of the media content from the buffer to the conference participant. The peripheral device may adaptively relay the portion of the media content to the conference participant, such as by reducing video quality and/or audio quality of the portion of the media content in a controlled manner. The peripheral device may perform a time alignment between the portion of the media content and the media content received by the second user device and then resume a real-time relay of media content using the second user device. As a result, the peripheral device can relay the media content to a conference participant during a transition between devices while reducing loss of information.

To describe some implementations in greater detail, reference is first made to examples of hardware and software structures used to implement a system for using a peripheral device to transition between user devices within a video conference. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106. For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
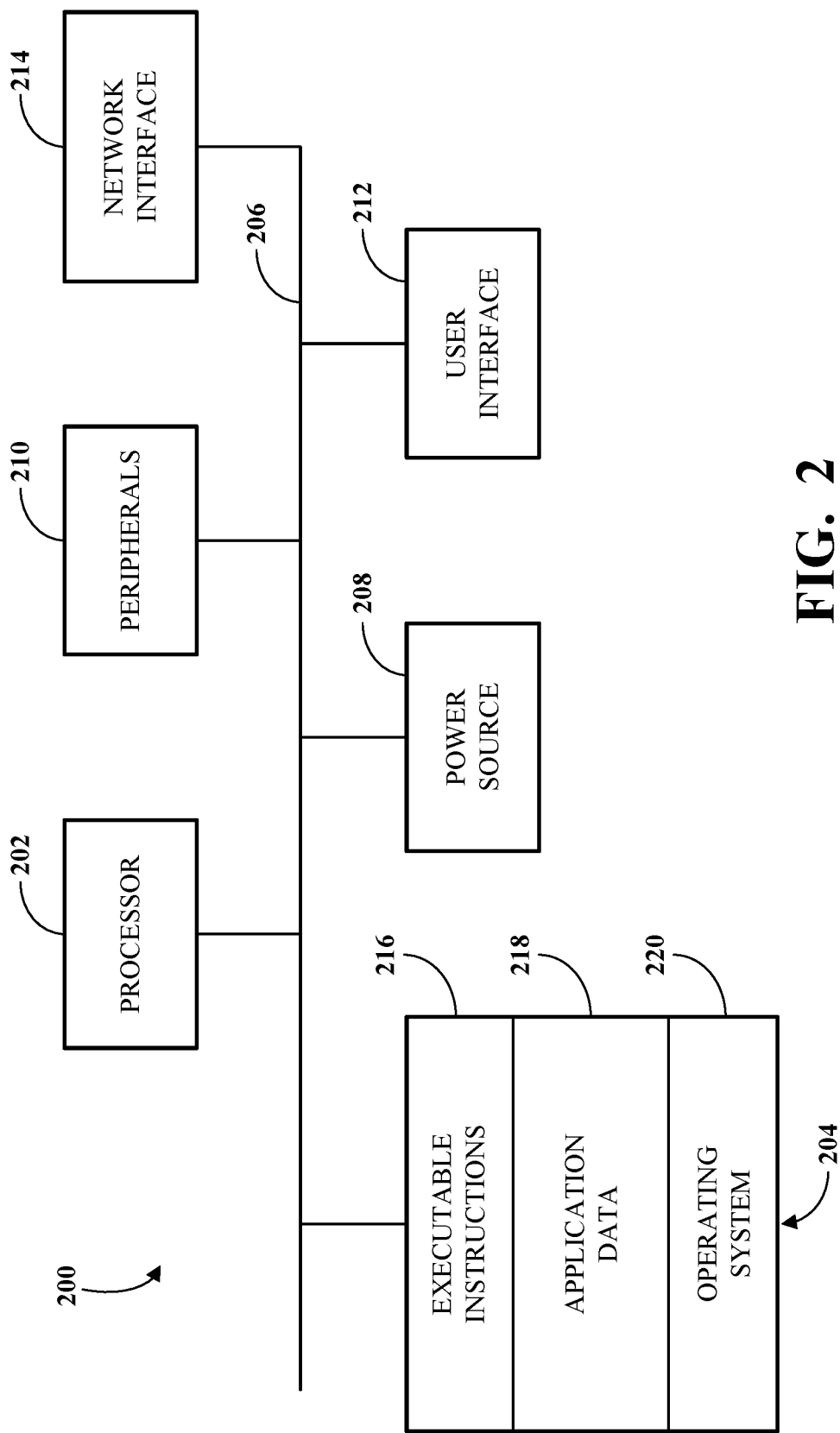
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be RAM (e.g., a DRAM module, such as DDR DRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, virtual reality display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
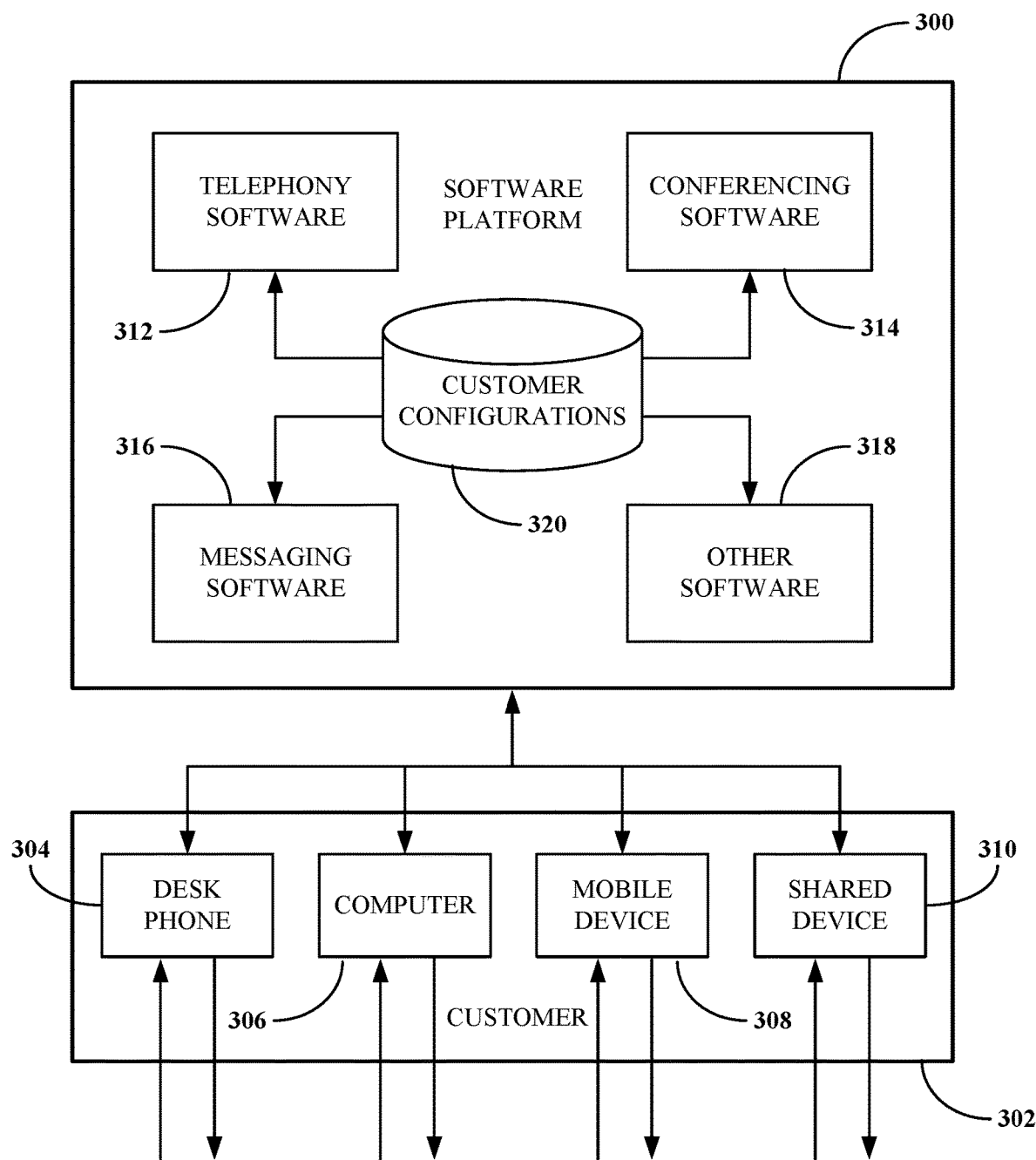
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients-a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include software for using a peripheral device to transition between user devices within a video conference. In some such cases, the conferencing software 314 may include some or all of the other software 318.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some, or all, of the software 312 through 318 may be combined into a single software application run on clients of the customer, such as one or more of the clients 304 through 310.

Figure 4:
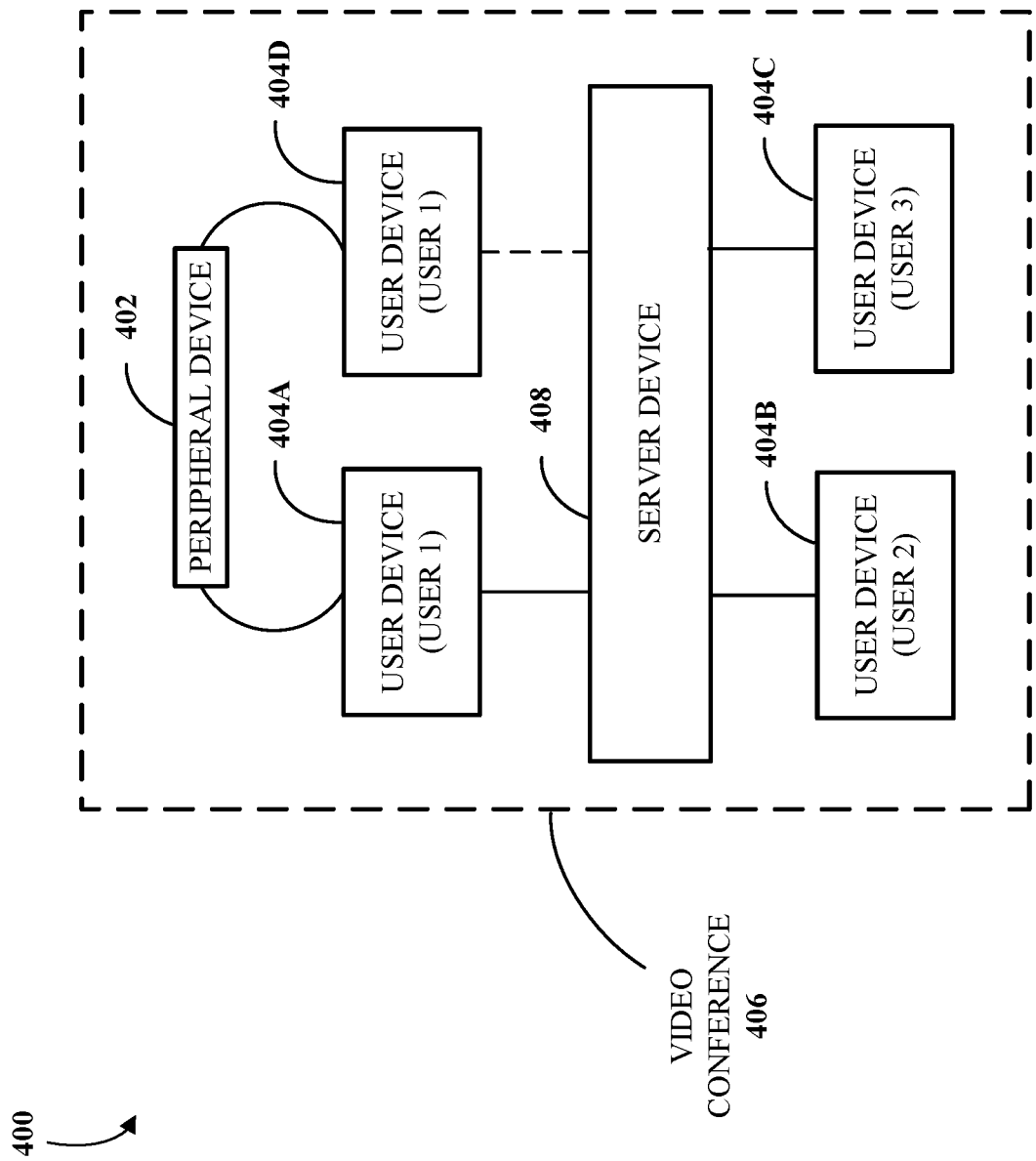
FIG. 4 is a block diagram of an example of a system for using a peripheral device to transition between user devices within a video conference.

FIG. 4 is a block diagram of an example of a system 400 for using a peripheral device 402 to transition between user devices 404A and 404D during a video conference 406. A first conference participant ("user 1") may be using the user device 404A to connect to the video conference 406. The video conference 406 may include other conference participants, such as a second conference participant ("user 2") using a user device 404B, and a third conference participant ("user 3") using a user device 404C. Each of the user devices 404A to 404C may be a client device such as one of the clients 104A through 104D shown in FIG. 1 or 304 through 310 shown in FIG. 3. A user device such as the user devices 404A to 404C may execute software (e.g., client-side conferencing software, which could, for example, be via a client application or a web application used to connect to a conference implemented using server-side conferencing software, such as the conferencing software 314 shown in FIG. 3) and may connect to a server device 408. The server device 408 may execute software (e.g., server-side conferencing software, such as the conferencing software 314) to support the video conference 406 between users using the user devices 404A to 404C. For example, the server device 408 could be a server at the datacenter 106 shown in FIG. 1, such as the application server 108 or the telephony server 112. Although four user devices 404A to 404D are shown and described by example, other numbers of user devices may be used with the system 400.

The user devices 404A to 404C may be used to communicate media content during the video conference 406. For example, the conference participants may use the user devices to send video data depicting themselves and audio data representing their speech to other conference participants and to receive video and audio data from the other conference participants. The user devices 404A to 404C may also connect to peripheral devices for relaying the media content to a conference participant. In this example, the user device 404A may connect to the peripheral device 402 for relaying the media content to the first conference participant. The peripheral device 402 could be a device configured to present video and/or audio data to the first conference participant, such as a wearable device (e.g., headphones, headset, smartwatch, or glasses) or another device (e.g., display or speakers). The user device 404A may connect to the peripheral device 402, for example, via a Bluetooth connection.

During the video conference 406, the first conference participant may wish to transition from the user device 404A to the user device 404D. For example, the user device 404A could be a smartphone that the first conference participant is using while traveling to a location (e.g., while walking or a passenger in a vehicle), and the user device 404D could be a desktop, laptop, or tablet at the location. In another example, the user device 404A could be a device associated with a particular space, such as a computer in an office or living room, and the user device 404D could be another device associated with another space, such as another computer in a conference room or kitchen. To reduce a loss of information associated with the video conference 406, such as a loss of media content and/or chat messages, the first conference participant may initiate a transition that designates the peripheral device 402 to buffer a portion of media content of the video conference 406. In some implementations, the first conference participant may initiate the transition and/or designate the peripheral device 402 through a GUI of the user device 404A.

Initiating the transition may cause the user device 404A to transmit an indication of the transition to the peripheral device 402. The indication may be a message to the peripheral device 402 that indicates the planned transition from one user device to another. The indication can be sent, for example, via the Bluetooth connection between the user device 404A and the peripheral device 402. The indication may cause the peripheral device 402 to temporarily buffer a portion of media content of the video conference 406. For example, the portion of the media content may include video and/or audio data that is transmitted from the user device 404A to the video conference 406. The portion of the media content may also include video and/or audio data that is received by the user device 404A from the video conference 406. The user device 404A may then perform, within the video conference 406, a transition of the first conference participant from the user device 404A connected to the video conference 406 to the user device 404D connected to the video conference 406. Performing the transition may include disconnecting the user device 404A from the video conference 406 (e.g., this begins the actual transition), connecting the user device 404D to the video conference 406, and terminating the communication between the user device 404A and the user device 404D. The peripheral device 402 can use the user device 404A to relay media content to the conference participant before the transition (e.g., via the Bluetooth connection), then use the buffer of the peripheral device 402 to relay the portion of the media content to the conference participant during the transition, then use the user device 404D to relay media content to the conference participant after the transition (e.g., via a second Bluetooth connection between the user device 404D and the peripheral device 402). While the user device 404A connects to the video conference 406 at a first time, and the user device 404D connects to the video conference 406 at a second time, the peripheral device 402 does not have to connect to the video conference 406 at any time.

During the transition, the peripheral device 402 can relay the portion of the media content from the buffer to the conference participant. The peripheral device 402 may adaptively relay the portion of the media content to the conference participant, such as by reducing video quality and/or audio quality of the portion of the media content in a controlled manner. The peripheral device 402 may perform a time alignment between the portion of the media content in the buffer and the media content received by the user device 404D. After the time alignment, the peripheral device 402 can resume a real-time relay of media content to the conference participant by using the user device 404D (e.g., this ends the actual transition). This may include the user device 404D communicating the portion of the media content during the video conference 406. As a result, the peripheral device 402 can be utilized during the transition between user devices 404A and 404D to reduce a loss of information.

While the first conference participant can use the peripheral device 402, and the portion of the media content buffered in the peripheral device 402, to transition from the user device 404A to the user device 404D, other conference participants can use other peripheral devices to transition between other user devices in the same way. For example, the second conference participant could use another peripheral device to transition from the user device 404B to another user device, and the third conference participant could use yet another peripheral device to transition from the user device 404C to yet another user device.

Figure 5:
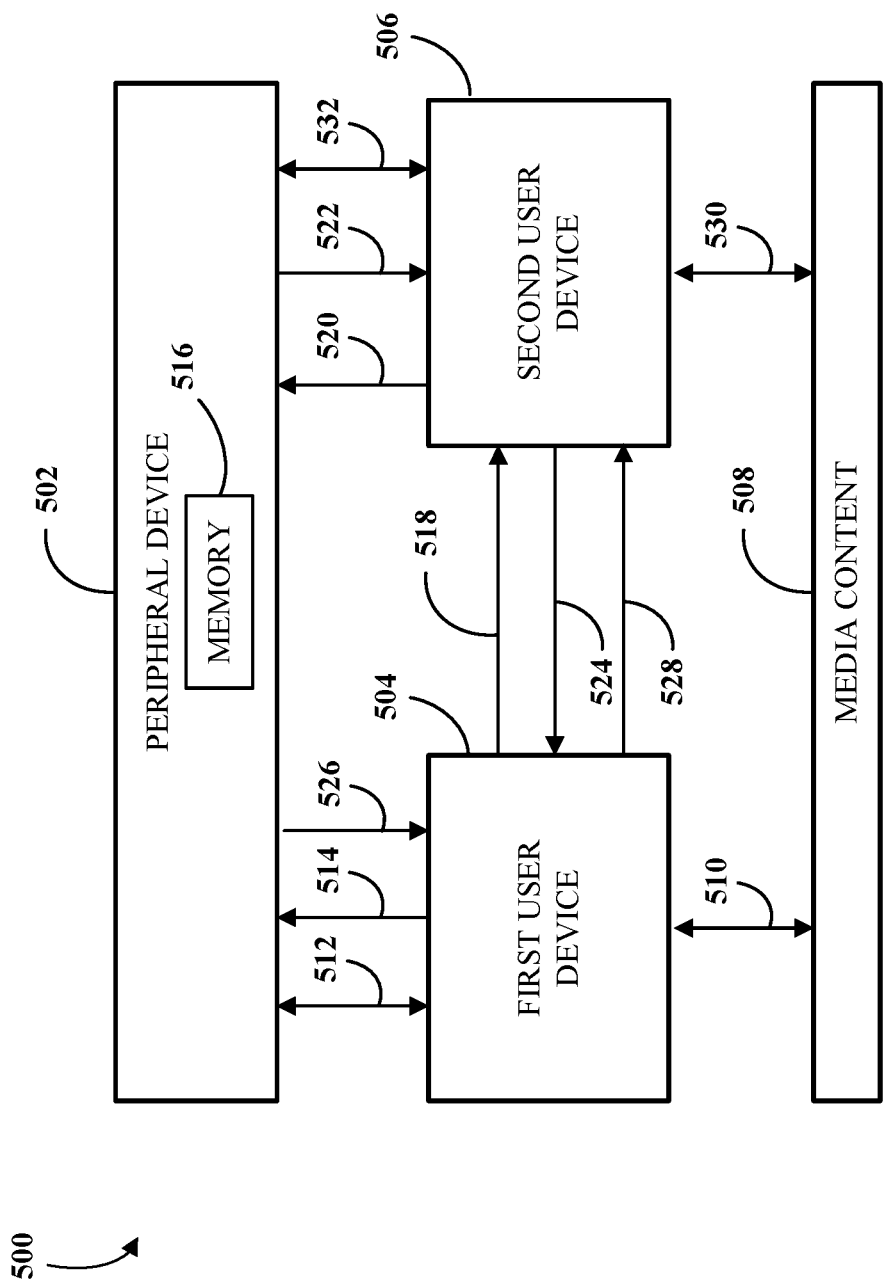
FIG. 5 is a block diagram of an example of transitioning between user devices.

FIG. 5 is a block diagram of an example of transitioning between user devices during a video conference. A system 500 may include a peripheral device 502, a first user device 504, and a second user device 506. The peripheral device 502 could be the peripheral device 402, the first user device 504 could be the user device 404A, and the second user device 506 could be the user device 404D of FIG. 4. A conference participant (e.g., the first conference participant of FIG. 4) may use the first user device 504 to connect to a video conference via a network (e.g., an Ethernet or Wi-Fi network). The conference participant may use the first user device 504 to communicate media content 508 in a media stream 510 during the video conference. The media stream 510 may include video and audio data that is transmitted from the first user device 504 to the video conference and video and audio data that is received by the first user device 504 from the video conference. The conference participant may also use the peripheral device 502 to relay the media content 508. For example, the peripheral device 502 may exchange a media stream 512 with the first user device 504. The peripheral device 502 could be a device configured to present video and/or audio data to the conference participant (e.g., a wearable device, such as headphones, a headset, a smartwatch, or glasses, or another device, such as a display or speakers). The first user device 504 may connect to the peripheral device 502, for example, via Bluetooth.

Figure 6:
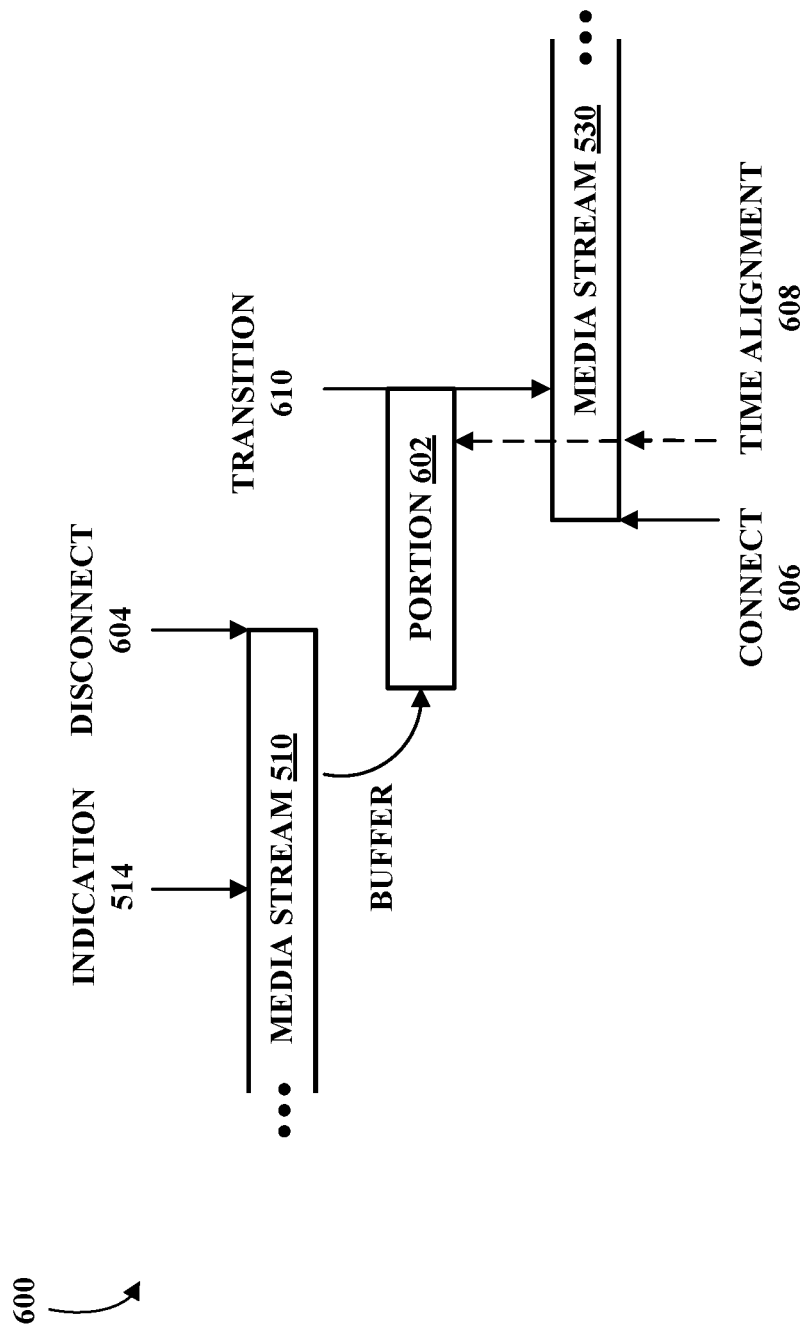
FIG. 6 is a block diagram of an example of timing associated with transitioning between user devices.

With additional reference to FIG. 6, a block diagram illustrates an example of timing 600 associated with transitioning from the first user device 504 to the second user device 506 within the video conference. The first user device 504 may receive, from the conference participant, an input that identifies the second user device 506 and/or the peripheral device 502. The input may cause the first user device 504 to transmit an indication 514 to the peripheral device 502. The indication 514 may cause the peripheral device 502 to temporarily buffer a portion 602 of the media content 508 in a memory 516 of the peripheral device 502. For example, the memory 516 could be RAM implemented by the peripheral device 502. The portion 602 of the media content 508 may include video and audio data that is transmitted in the media stream 510. Buffering the portion 602 of the media content 508 may include storing less than a predefined amount of time of the media content 508 received by the first user device 504 in the memory 516. For example, the memory 516 could be a micro-buffer configured to store less than ten seconds of the media content 508. The input may also cause the first user device 504 to communicate a handoff request 518 to the second user device 506 to begin the transition from the first user device 504 to the second user device 506.

The second user device 506, based on the handoff request 518, may transmit a message 520 to the peripheral device 502 to establish communication with the peripheral device 502. In some cases, the handoff request 518 can establish a new connection between the second user device 506 and the peripheral device 502. In some cases, the handoff request 518 can establish that an existing connection between the second user device 506 and the peripheral device 502 remains available. The second user device 506 may connect to the peripheral device 502, for example, via Bluetooth. The peripheral device 502 may acknowledge the message 520 with a return message 522 to the second user device 506. Based on a successful communication between the second user device 506 and the peripheral device 502, determined by the message 520 and the return message 522, the second user device 506 may communicate an acknowledgement 524 of the handoff request 518 to the first user device 504. Based on a successful buffering of the portion 602 of the media content 508 in the memory 516, the peripheral device 502 may also communicate an acknowledgement 526 to the first user device 504. Referring also to FIG. 6, based on the acknowledgement 524 and the acknowledgement 526, the first user device 504 may disconnect 604 from the video conference while the peripheral device 502 relays the portion 602 of the media content 508 to the conference participant. Disconnecting from the video conference may include the first user device 504 terminating the media stream 510. In some cases, the first user device 504 may also disconnect from the network (e.g., the Ethernet or Wi-Fi network). The first user device 504 may then communicate a handoff message 528 to the second user device 506 to complete the transition.

Based on the handoff message 528, and while the peripheral device 502 relays the portion 602 of the media content 508, the second user device 506 may connect 606 to the video conference. Connecting to the video conference may include the second user device 506 connecting to the network (e.g., the Ethernet or Wi-Fi network), including without the peripheral device 502 connecting to the same network. Connecting to the video conference may also include the second user device 506 communicating the media content 508 in a media stream 530 during the video conference. The media stream 530 may include video and audio data that is transmitted from the first user device 504 to the video conference and video and audio data that is received by the first user device 504 from the video conference. The second user device 506 may also relay the media content 508 to the peripheral device 502 in a media stream 532 to enable the peripheral device 502 to perform a time alignment between the portion 602 of the media content 508 and the media stream 532. In at least some cases, the first user device 504 may disconnect 604 from the network and the video conference, and the second user device 506 may connect 606 to the network and the video conference, without the peripheral device 502 connecting to the network.

Referring also to FIG. 6, the peripheral device 502 may perform a time alignment 608 between the portion 602 of the media content 508 and the media content 508 that is received by the second user device 506 in the media stream 530. Based on the time alignment 608, the peripheral device 502 may adaptively relay the portion 602 of the media content 508 to the conference participant, such as by reducing video quality (e.g., delivering fewer frames per second) and/or audio quality (e.g., delivering fewer kilobits per second) of the portion of the media content 508 in a controlled manner (e.g., a dynamic buffer). Based on the time alignment 608, the peripheral device 502 may transition 610 from relaying the portion 602 of the media content 508 to relaying the media stream 530. For example, buffering the portion 602 of the media content 508 could be performed by a transmission of the media content 508 in real time from the first user device 504 to the peripheral device 502. The peripheral device 502 can fill the memory 516 using real time data while relaying non-real time data to the conference participant during the transition. For example, before the transition, the portion 602 could compress in the memory 516. Then, during the transition, the portion 602 could be relayed to the conference participant at a normal speed for the video conference. Then, after the transition, the portion 602 could be relayed at a speed based on the time alignment 608. This could result in a temporary reduction in playback speed (e.g., 5%) that would likely be unnoticeable to the conference participant while still accommodating the transition. For example, this could include speeding up the media content (e.g., going from 10 frames per second to 12 frames per second) or slowing down the media content (e.g., dropping every other frame) before returning to real time delivery of media content to the conference participant. The peripheral device 502 may also delete the portion 602 of the media content 508 from the memory 516 after the transition 610, such as by overwriting the memory 516. The second user device 506 may also terminate communications with the first user device 504 after the transition 610.

In some implementations, the portion 602 of the media content 508 may include metadata associated with the video conference, such as chat messages and/or emoji based reactions associated with the video conference. This may enable maintaining the metadata (e.g., the chat messages and/or emoji based reactions) during the transition from the first user device 504 to the second user device 506. As a result, the conference participant can view information associated with the video conference (e.g., the chat messages and/or emoji based reactions, exchanged between conference participants before the transition 610, after the transition 610) as though the conference participant never left the video conference.

In some implementations, an authorization of the first user device 504 may enable the first user device 504 to connect to the video conference. For example, the authorization could be a permission or credential from a server device (e.g., the server device 408). The authorization could be required to enable the first user device 504 to join the video conference. The conference participant can extend the authorization to the second user device 506 based on the authorization of the first user device 504 and the connection between the first user device 504 and the peripheral device 502. For example, the conference participant can use the peripheral device 502 to transfer the authorization from the first user device 504 to the second user device 506. As a result, the second user device 506 can join the video conference without obtaining the authorization from the server device. In some implementations, the peripheral device 502 could be a wearable technology, such as augmented reality (AR) glasses. The conference participant can look at the second user device 506, while using the AR glasses and the first user device 504 to connect to the video conference, to selectively authorize the second user device 506 to connect to the video conference.

In some implementations, a machine learning model may be used to determine the portion 602 of the media content 508 to buffer in the memory 516 (e.g., the predefined amount of time), the second user device 506 for transitioning, and/or the peripheral device 502. The machine learning may be trained using historical information, including past selections of user devices, past selections of peripheral devices, and/or past buffering during transitions. For example, the machine learning model can be trained using a training data set including data samples representing parameters for historical transitions. The training data set can enable the machine learning model to learn patterns, such as particular user devices, particular peripheral devices, and particular buffering. The training can be periodic, such as by updating the machine learning model on a discrete time interval basis (e.g., once per week or month), or otherwise. The training data set may derive from multiple conference participants or may be specific to a particular conference participant (e.g., the first conference participant). The machine learning model may, for example, be or include one or more of a neural network (e.g., a convolutional neural network, recurrent neural network, deep neural network, or other neural network), decision tree, vector machine, Bayesian network, cluster-based system, genetic algorithm, deep learning system separate from a neural network, or other machine learning model.

Figure 7:
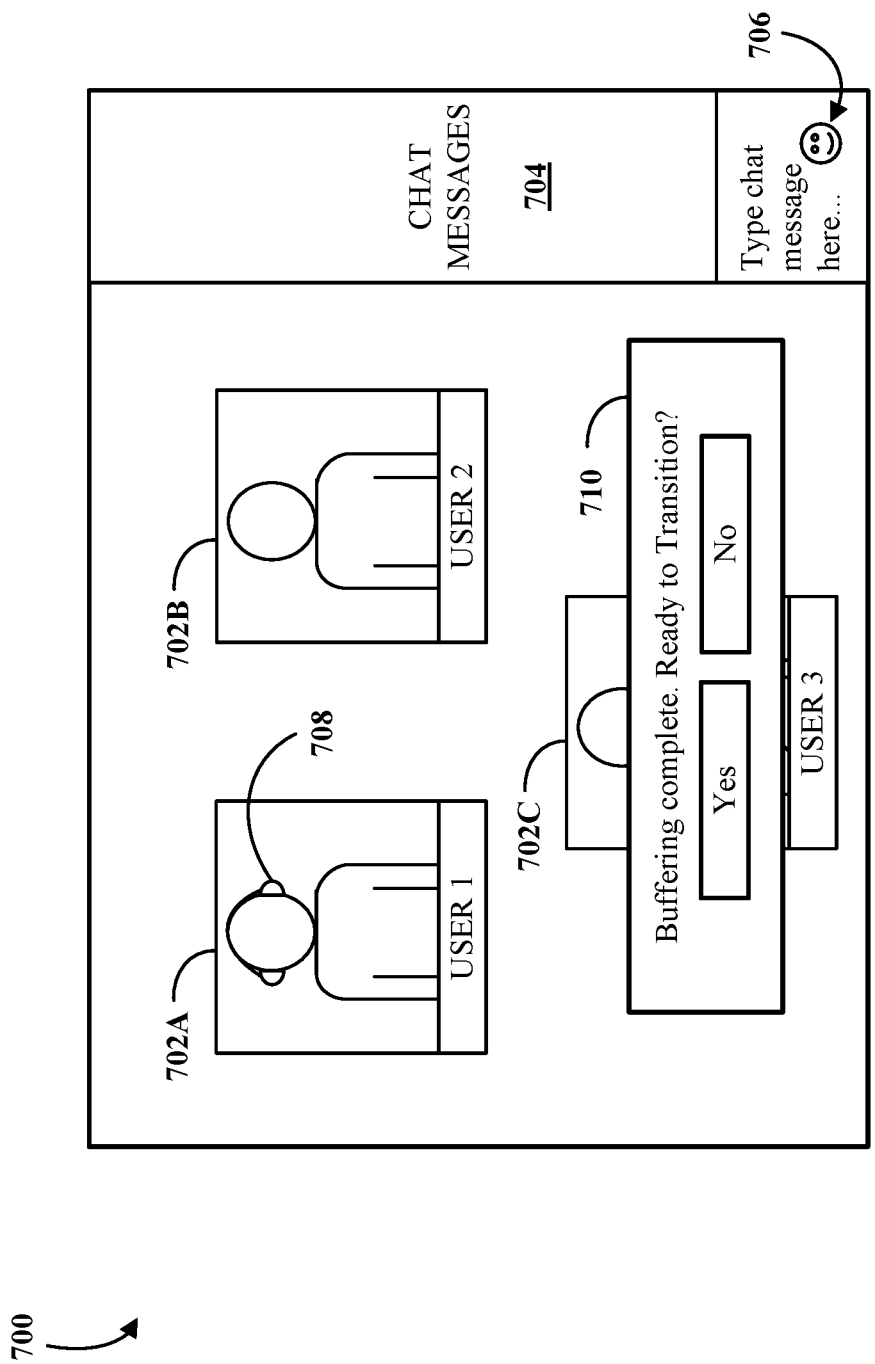
FIG. 7 is an illustration of an example of a graphical user interface (GUI) output for display during a video conference.

FIG. 7 is an illustration of an example of a GUI 700 output for display during a video conference. The GUI 700 could be configured for display to a user interface of a user device, such as the user device 404A of FIG. 4, or the first user device 504 of FIG. 5. For example, the GUI 700 could be configured for display to a user interface like the user interface 212. The GUI 700 may include user tiles associated with conference participants, such as a user tile 702A associated with the first conference participant ("user 1") using user device 404A, a user tile 702B associated with the second conference participant ("user 2") using user device 404C, and a user tile 702C associated with the third conference participant ("user 3") using user device 404D of FIG. 4. The GUI 700 may also include a history of chat messages 704 that may be typed and exchanged by the conference participants during the video conference. The GUI 700 may also include emoji based reactions 706 exchanged between the conference participants.

The GUI 700 could be output to the user device 404A (or the first user device 504) of the first conference participant at a first time. The first conference participant may have a peripheral device 708, such as a headset visible in the user tile 702A. The first conference participant may transmit (e.g., from the user device 404A) an indication to the peripheral device 708 to temporarily buffer a portion of media content of the video conference. When buffering is complete, the GUI 700 may display a message 710 indicating buffering is complete and requesting input from the first conference participant to complete the transition ("Yes" or "No"). When the first conference participant is ready to transition ("Yes"), the peripheral device 708 may then be used to perform, within the video conference, the transition from the user device 404A to the user device 404D (or the second user device 506). Performing the transition may include causing the peripheral device 708 to relay the portion of the media content during the transition. The portion of the media content may include video and audio data, including the video data represented by the user tiles 702A to 702C, and the audio data associated with the user tiles 702A to 702C. The portion of the media content may also include metadata associated with the video conference, such as the history of chat messages 704 and the emoji based reactions 706. The GUI 700 could then be output to the user device 404D at a second time, including with the history of chat messages 704 and the emoji based reactions 706 preserved the buffering.

Figure 8:
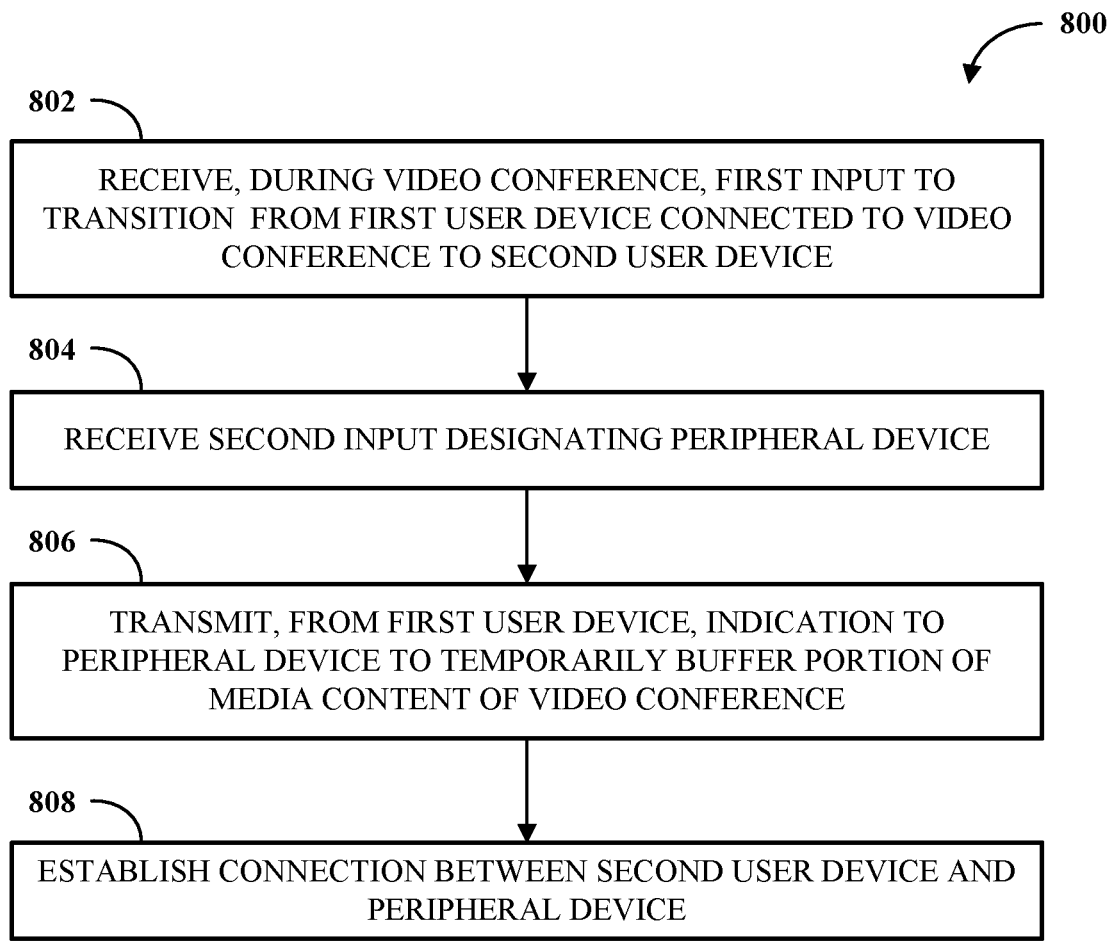
FIG. 8 is a flowchart of an example of a technique for buffering a portion of media content in a peripheral device.

To further describe some implementations in greater detail, reference is next made to examples of techniques which may be performed using a peripheral device. FIG. 8 is a flowchart of an example of a technique 800 for buffering a portion of media content in a peripheral device. The technique 800 can be executed using computing devices, such as the systems, hardware, and software described with respect to FIGS. 1-7. The technique 800 can be performed, for example, by executing a machine-readable program or other computer-executable instructions, such as routines, instructions, programs, or other code. The steps, or operations, of the technique 800 or another technique, method, process, or algorithm described in connection with the implementations disclosed herein can be implemented directly in hardware, firmware, software executed by hardware, circuitry, or a combination thereof.

For simplicity of explanation, the technique 800 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 802, a system may receive, during a video conference, a first input to transition from a first user device connected to a video conference to a second user device. For example, the system 500 of FIG. 5, via a GUI of the first user device 504, may receive the first input. The first input may be provided by a conference participant (e.g., the first conference participant of FIG. 4, or "user 1") that wishes to transition from the first user device to the second user device (e.g., the second user device 506). In some implementations, a machine learning model could predict the first input. The machine learning model could run on the first user device.

At 804, the system may receive, during the video conference, a second input designating a peripheral device. For example, the system 500 of FIG. 5, via a GUI of the first user device 504, may receive the second input. The second input may be provided by a conference participant that wishes to transition from the first user device to the second user device by utilizing the peripheral device (e.g., the peripheral device 402, or the peripheral device 502). The peripheral device may be a device that the conference participant is using during the video conference, such as a wearable device (e.g., headphones, headset, smartwatch, or glasses) or another device configured to present video and/or audio data to the conference participant (e.g., display or speakers). The first user device may be connected to the peripheral device via a short-range wireless connection such as Bluetooth. In some implementations, a machine learning model can predict the second input. The machine learning model could run on the first user device.

At 806, the system may transmit, from the first user device connected to the video conference and associated with the conference participant, an indication to the peripheral device to temporarily buffer a portion of media content of the video conference. For example, the first user device 504 could transmit the indication 514 to the peripheral device 502 to temporarily buffer the portion 602 of the media content 508 of the video conference. The indication may cause the peripheral device to temporarily buffer the portion of the media content of the video conference. The portion of the media content may include video and audio data that is transmitted via the first user device. The portion of the media content may also include metadata associated with the video conference, such as chat messages and emoji based reactions. Buffering the portion of the media content may include storing less than a predefined amount of time of the media content in a memory of the peripheral device (e.g., a RAM, such as a static or dynamic RAM). In some implementations, a machine learning model can predict the portion of the media content to buffer in the memory. The machine learning model could run on the first user device and/or the peripheral device.

At 808, the system may establish a connection between the second user device and the peripheral device. The connection may be established based on the first input, the second input, and/or the indication. The connection could be another short-range wireless connection such as Bluetooth. For example, the connection could be established via the message 520 and the return message 522 of FIG. 5. Establishing the connection may then enable a transition between user devices (e.g., from the first user device to the second user device) to be performed within the video conference.

Figure 9:
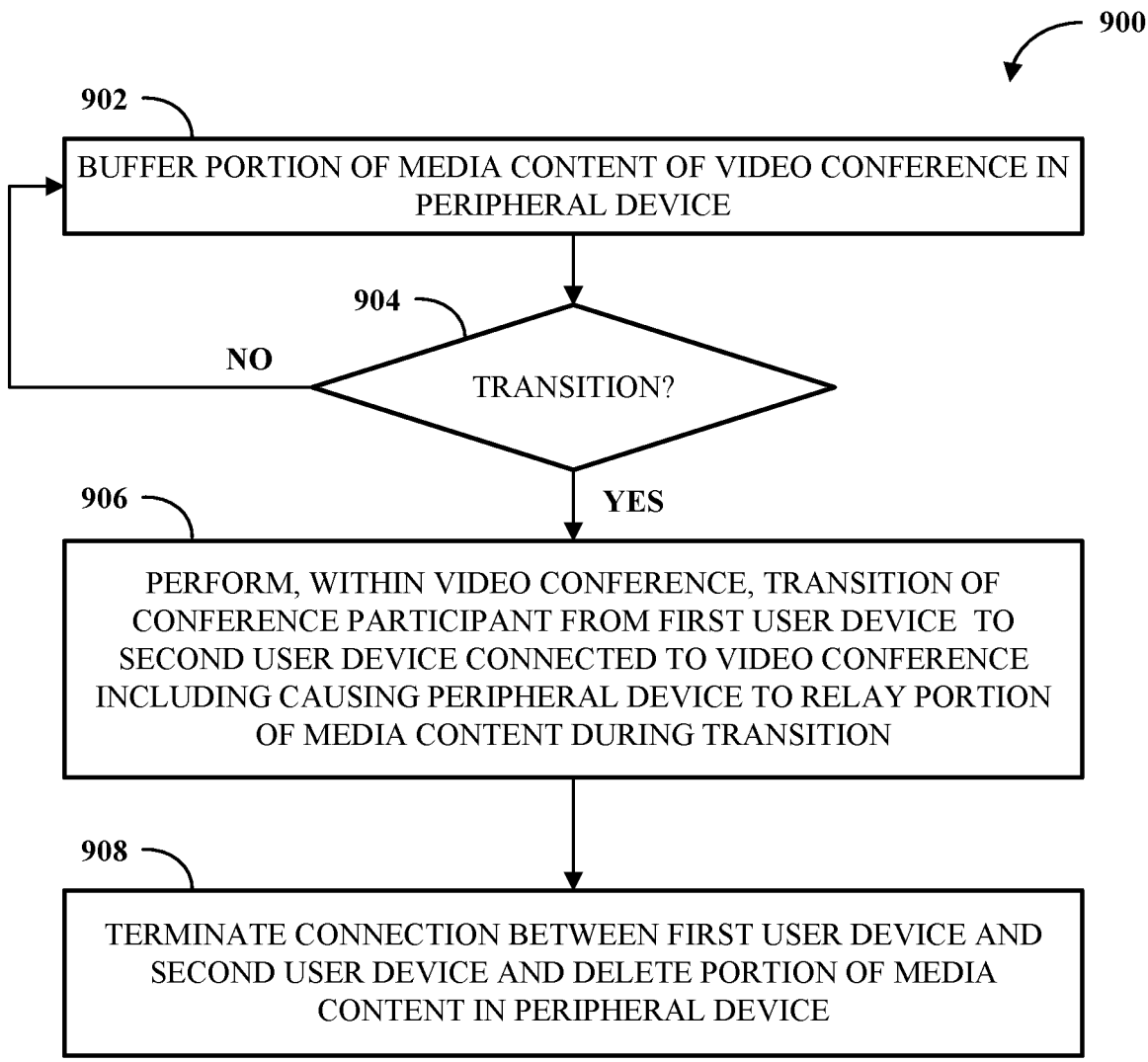
FIG. 9 is a flowchart of an example of a technique for using a peripheral device to transition between user devices within a video conference.

FIG. 9 is a flowchart of an example of a technique 900 for using a peripheral device to transition between user devices within a video conference. The technique 900 can be executed using computing devices, such as the systems, hardware, and software described with respect to FIGS. 1-7. The technique 900 can be performed, for example, by executing a machine-readable program or other computer-executable instructions, such as routines, instructions, programs, or other code. The steps, or operations, of the technique 900 or another technique, method, process, or algorithm described in connection with the implementations disclosed herein can be implemented directly in hardware, firmware, software executed by hardware, circuitry, or a combination thereof.

For simplicity of explanation, the technique 900 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 902, a system may buffer a portion of media content of a video conference in a peripheral device. For example, the system 500 of FIG. 5, may buffer the portion 602 of the media content 508 of the video conference in the peripheral device 502. The system may buffer the portion of the media content based on the technique 800 described in FIG. 8, including step 806. For example, the system may buffer the portion of the media content in a memory of the peripheral device based on an indication from the first user device (e.g., the first user device 504). In some implementations, a machine learning model can predict the portion of the media content to buffer in the memory. The machine learning model could run on the first user device and/or the peripheral device. While the system buffers the portion, a second user device (e.g., the second user device 506) may establish a connection with the peripheral device.

At 904, the system may determine if a conference participant (e.g., the first conference participant of FIG. 4, or "user 1") is ready to transition from the first user device to the second user device. For example, the system, via a GUI of the first user device, may display to the conference participant that the system is ready to perform the transition (e.g., the message 710, displayed based on completing a buffering of the portion of the media content and/or establishing a connection between the second user device and the peripheral device) and may wait to receive an input. If the system does not receive an input from the conference participant to perform the transition ("No"), the system can wait, returning to 902 to update the portion of the media content stored in the peripheral device with current media content associated with the video conference. If the system does receive an input to perform the transition ("Yes"), the system can continue to 906.

At 906, the system may perform, within the video conference, a transition of the conference participant from the first user device to the second user device connected to the video conference. The transition may include causing the peripheral device to relay the portion of the media content during the transition. For example, the transition may include the peripheral device 502 relaying the portion 602 of the media content 508 during the transition. In some implementations, the peripheral device may perform a time alignment between the portion of the media content and the media content that is received by the second user device in the media stream. Based on the time alignment, the peripheral device may adaptively relay the portion of the media content to the conference participant, such as by reducing video quality and/or audio quality of the portion of the media content in a controlled manner. Based on the time alignment, the peripheral device may transition from relaying the portion of the media content to relaying the media stream in real time.

At 908, the system may terminate communications between the first user device and the second user device. The system may also delete the portion of the media content from the memory of the peripheral device. For example, the system may delete the portion of the media content by overwriting the memory in the peripheral device.

Some implementations may include a method that includes transmitting, from a first user device connected to a video conference and associated with a conference participant, an indication to a peripheral device to buffer a portion of media content of the video conference; and performing, within the video conference, a transition of the conference participant from the first user device to a second user device connected to the video conference including causing the peripheral device to relay the portion of the media content during the transition. In some implementations, the media content includes data transmitted from the first user device. In some implementations, the peripheral device is a wearable device associated with the conference participant. In some implementations, the method may include buffering the portion of the media content by storing less than a predefined amount of time of the media content received by the first user device in a RAM of the peripheral device. In some implementations, the method may include relaying the portion of the media content to the conference participant during the transition with the portion of the media content being reduced in at least one of video quality or audio quality. In some implementations, the method may include disconnecting the first user device from a network and the video conference; and connecting the second user device to the network and the video conference without connecting the peripheral device to the network. In some implementations, the method may include maintaining chat messages associated with the video conference during the transition from the first user device to the second user device by including the chat messages in the portion of the media content. In some implementations, the method may include receiving an input that identifies the second user device and the peripheral device, the input causing a communication between the second user device and the peripheral device before the transition from the first user device to the second user device. In some implementations, the method may include allowing the second user device to connect to the video conference based on an authorization of the first user device to connect to the video conference and a connection between the first user device and the peripheral device. In some implementations, the method may include determining the portion of the media content to buffer by using a machine learning model.

Some implementations may include an apparatus that includes a memory and a processor configured to execute instructions stored in the memory to transmit, from a first user device connected to a video conference and associated with a conference participant, an indication to a peripheral device to buffer a portion of media content of the video conference; and perform, within the video conference, a transition of the conference participant from the first user device to a second user device connected to the video conference including causing the peripheral device to relay the portion of the media content during the transition. In some implementations, the processor is further configured to execute instructions stored in the memory to determine the second user device using a machine learning model. In some implementations, the processor is further configured to execute instructions stored in the memory to buffer the portion of the media content by storing less than a ten seconds of the media content received by the first user device in a micro-buffer of the peripheral device. In some implementations, the processor is further configured to execute instructions stored in the memory to delete the portion of the media content after the transition. In some implementations, the peripheral device is a headset.

Some implementations may include a non-transitory computer readable medium storing instructions operable to cause one or more processors to perform operations comprising transmitting, from a first user device connected to a video conference and associated with a conference participant, an indication to a peripheral device to buffer a portion of media content of the video conference; and performing, within the video conference, a transition of the conference participant from the first user device to a second user device connected to the video conference including causing the peripheral device to relay the portion of the media content during the transition. In some implementations, the operations further comprise communicating a handoff event between the first user device and the second user device. In some implementations, the operations further comprise terminating a communication between the first user device and the second user device after the transition. In some implementations, the operations further comprise performing a time alignment between the portion of the media content and the media content received by the second user device. In some implementations, the peripheral device comprises AR glasses.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
   transmitting, from a first user device connected to a video conference and associated with a conference participant, an indication to a peripheral device to buffer a portion of media content of the video conference;
   performing, within the video conference, a transition of the conference participant from the first user device to a second user device connected to the video conference including causing the peripheral device to relay the portion of the media content during the transition;
   terminating the connection of the first user device from the video conference before the portion of the media content is relayed to the video conference;
   storing, for later transmission to the second user device, real-time data in memory during the transition from the first user device to the second user device while relaying non-real time data to the second user device; and
   changing a speed of the relay to the second user device until the media content displayed on the second user device is aligned with the video conference.

2. The method of claim 1, wherein the media content includes data transmitted from the first user device.

3. The method of claim 1, wherein the peripheral device is a wearable device associated with the conference participant.

4. The method of claim 1, further comprising:
   buffering the portion of the media content by storing less than a predefined amount of time of the media content received by the first user device in a random access memory (RAM) of the peripheral device.

5. The method of claim 1, further comprising:
   relaying the portion of the media content to the conference participant during the transition with the portion of the media content being reduced in at least one of video quality or audio quality.

6. The method of claim 1, further comprising:
   maintaining chat messages associated with the video conference during the transition from the first user device to the second user device by including the chat messages in the portion of the media content.

7. The method of claim 1, further comprising:
   receiving an input that identifies the second user device and the peripheral device, the input causing a communication between the second user device and the peripheral device before the transition from the first user device to the second user device.

8. The method of claim 1, further comprising:
   allowing the second user device to connect to the video conference based on an authorization of the first user device to connect to the video conference and a connection between the first user device and the peripheral device.

9. The method of claim 1, further comprising:
   determining the portion of the media content to buffer by using a machine learning model.

10. An apparatus, comprising:
    a memory; and
    a processor configured to execute instructions stored in the memory to:
       transmit, from a first user device connected to a video conference and associated with a conference participant, an indication to a peripheral device to buffer a portion of media content of the video conference;
       perform, within the video conference, a transition of the conference participant from the first user device to a second user device connected to the video conference including causing the peripheral device to relay the portion of the media content during the transition;
       reduce video quality and/or audio quality of the portion of the media content during the transition from the first user device to the second user device; and
       terminate the connection of the first user device from the video conference before the portion of the media content is relayed to the video conference, wherein the video quality and/or the audio quality are reduced by increasing a number of frames played per second or dropping some of the frames after the connection with the first user device is terminated until the media content returns to a real time delivery of the media content on the second user device.

11. The apparatus of claim 10, wherein the processor is further configured to execute instructions stored in the memory to:
    determine the second user device using a machine learning model.

12. The apparatus of claim 10, wherein the processor is further configured to execute instructions stored in the memory to:
    buffer the portion of the media content by storing less than ten seconds of the media content received by the first user device in a micro-buffer of the peripheral device.

13. The apparatus of claim 10, wherein the peripheral device is a headset.

14. A non-transitory computer readable medium storing instructions operable to cause one or more processors to perform operations comprising:
    transmitting, from a first user device connected to a video conference and associated with a conference participant, an indication to a peripheral device to buffer a portion of media content of the video conference;
    performing, within the video conference, a transition of the conference participant from the first user device to a second user device connected to the video conference including causing the peripheral device to relay the portion of the media content during the transition;
    terminating the connection of the first user device from the video conference before the portion of the media content is relayed to the video conference;
    storing, for later transmission to the second user device, real-time data in memory during the transition from the first user device to the second user device while relaying non-real time data to the second user device; and changing a speed of the relay to the second user device until medica content displayed the second user device is aligned with the media content of the video conference.

15. The non-transitory computer readable medium storing instructions of claim 14, wherein the operations further comprise:
communicating a handoff event between the first user device and the second user device.

16. The non-transitory computer readable medium storing instructions of claim 14, wherein the operations further comprise:
terminating a communication between the first user device and the second user device after the transition.

17. The non-transitory computer readable medium storing instructions of claim 14, wherein the operations further comprise:
performing a time alignment between the portion of the media content and the media content received by the second user device.

18. The method of claim 1, further comprising:
performing a time alignment between the portion of the media content and the video conference by increasing a number of frames played per second or dropping some of the frames after the connection with the first user device is terminated; and
transitioning from the portion of the media content to the video conference on the second user device.

19. The apparatus of claim 10, wherein the portion of the media content of the video conference comprises information associated with the video conference.

20. The non-transitory computer readable medium storing instructions of claim 14, wherein the memory stores chat messages, emoji based reactions, or information exchanged between conference participates before the transition and/or after the transition.

* * * * *